J. J. ROBINSON.
TRANSMISSION GEARING.
APPLICATION FILED JAN. 4, 1917.
1,280,552.
Patented Oct. 1, 1918.
3 SHEETS—SHEET 1.
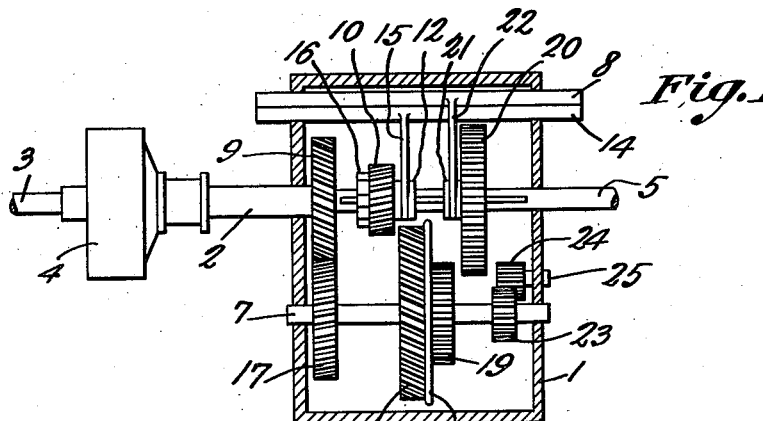
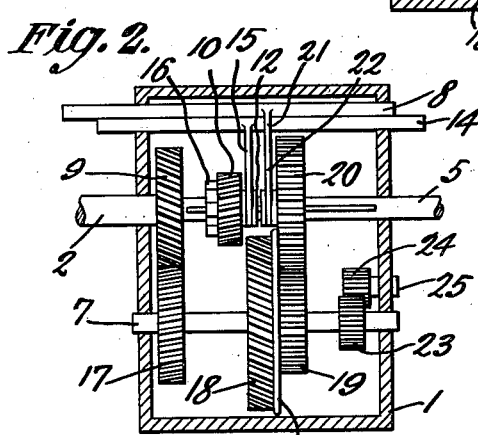
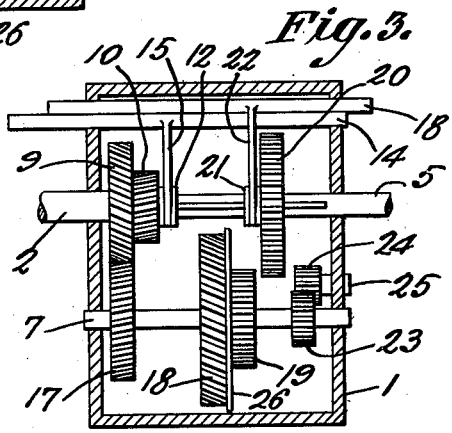
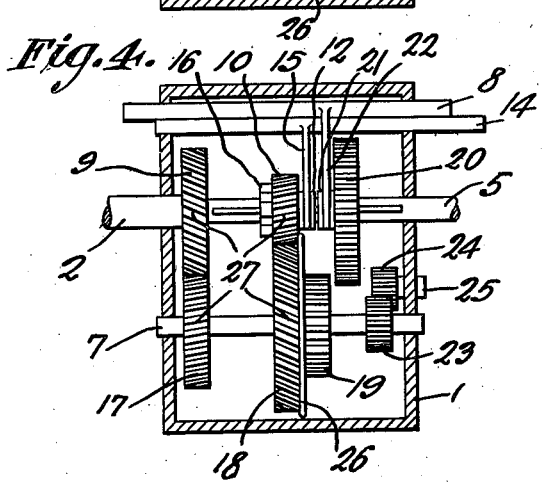
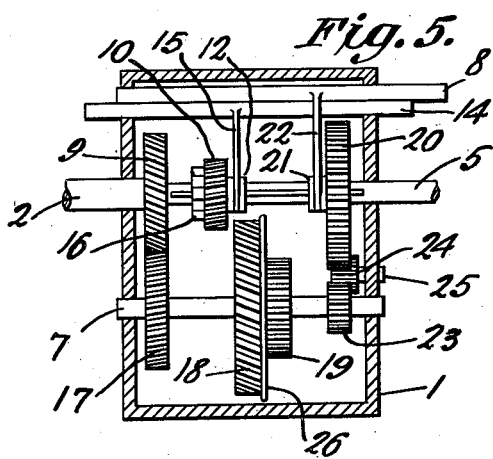
Witnesses
J. J. Robinson, Inventor
by C A Snow & Co.
Attorneys

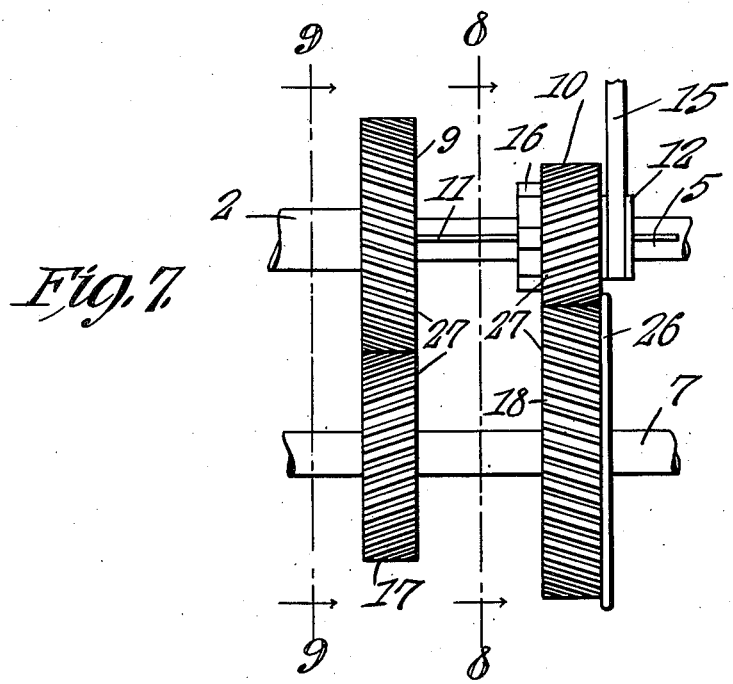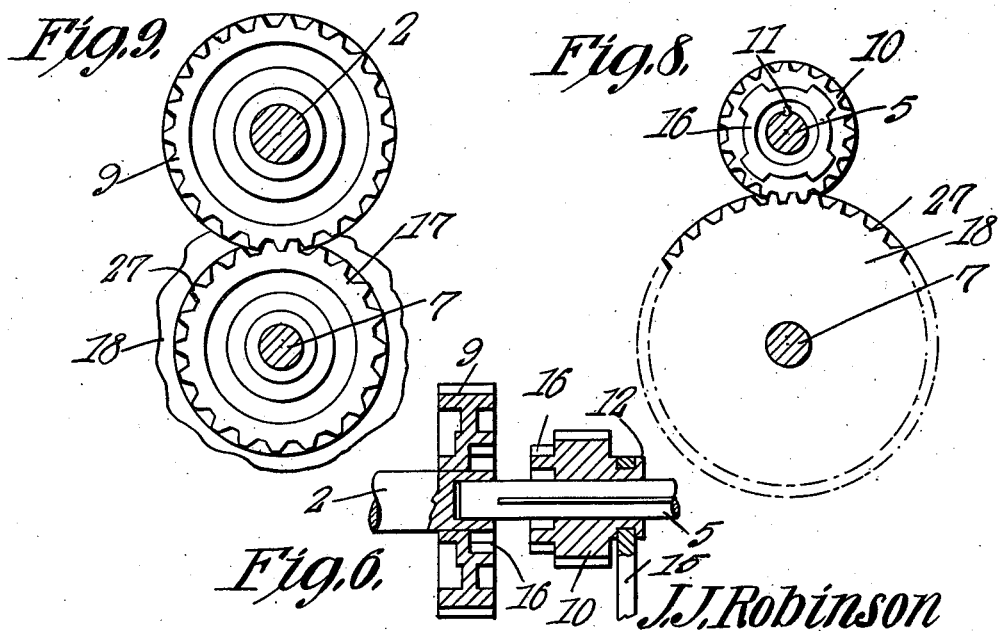

UNITED STATES PATENT OFFICE.

JONATHAN JOHN ROBINSON, OF PHILADELPHIA, PENNSYLVANIA, ASSIGNOR OF ONE-FOURTH TO JOHN L. STEELE AND ONE-FOURTH TO CLARKE P. POND, BOTH OF PHILADELPHIA, PENNSYLVANIA.

TRANSMISSION-GEARING.

1,280,552.

Specification of Letters Patent.

Patented Oct. 1, 1918.

Application filed January 4, 1917. Serial No. 140,572.

*To all whom it may concern:*

Be it known that I, JONATHAN J. ROBINSON, a citizen of the United States, residing at Philadelphia, in the county of Philadelphia and State of Pennsylvania, have invented a new and useful Transmission-Gearing, of which the following is a specification.

The device forming the subject matter of this application is a speed transmission gearing for motor cars, and is of that general type in which three speeds ahead and one speed in reverse are provided.

The invention aims, generally speaking, to provide a transmission mechanism of this sort which, without increasing the number of the gear wheels, will provide for three forward speeds, one of which is higher than the direct drive, another of which is lower than the direct drive.

By way of explanation it may be stated that automobiles the engines of which include six, eight or more cylinders, have power enough so that the speed produced by a direct connection between the engine shaft and the driven shaft which communicates motion to the wheels, may be maintained under practically all conditions and grades of the road. The present invention contemplates that the lower speed may be used for starting the car, the direct drive being available for use under all ordinary conditions, and it being possible to go into extra-high speed, upon occasion, without in any way interfering with the power possessed by the car for climbing a hill on the direct drive.

Practically all automobiles of medium price are equipped with a transmission gearing of the ordinary type, having three speeds forward and one speed reverse. Some of the higher priced cars are supplied with heavier and larger transmission gearing, so constructed that four speeds forward and one speed in reverse are available, but this construction is expensive to install, and demands both a longer car and one the construction of which must be reinforced and strengthened throughout. The transmission gearing used on cars of this kind, therefore, is not available for use on cars which must be sold at a comparatively moderate price. The transmission mechanisms installed on these cars of high cost have for the third speed ahead, a direct drive, and the fourth speed ahead, a gearing somewhat faster than the direct, but for reasons outlined hereinbefore, transmission systems of this type have not been used on moderate priced cars.

In view of the foregoing, the present invention proposes novel mechanism whereby the advantages of the fourth or highest speed gear is available for use on a moderate priced car, without necessitating a longer wheel base, or a stronger and consequently more expensive construction.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing:—

Figure 1 shows in section, a transmission mechanism constructed in accordance with the present invention, the parts being in the positions which they will assume when the driving shaft, which is coupled to the engine shaft, rotates freely without imparting movement to the driven shaft which actuates with the wheels of the vehicle;

Fig. 2 is a section similar to Fig. 1, but showing the parts in the positions which they will assume when the driven shaft is rotated at a slower speed than the driving shaft;

Fig. 3 is a view like Fig. 1 but illustrating the parts in the positions which they will occupy when power is transmitted directly from the driving shaft to the driven shaft;

Fig. 4 is a sectional view illustrating the relation of the various parts when the driven shaft is rotated at a higher speed than the driving shaft;

Fig. 5 is a view similar to the views above mentioned, but illustrating the parts as they will appear when a reverse rotation is imparted to the driven shaft;

Fig. 6 is a sectional detail showing the operative connection between the driving and driven shafts;

Fig. 7 is a diagrammatic elevation illustrating the coöperation between certain of the gear wheels and pinions;

Fig. 8 is a section on the line 8—8 of Fig. 7;

Fig. 9 is a section on the line 9—9 of Fig. 7;

Figure 10:
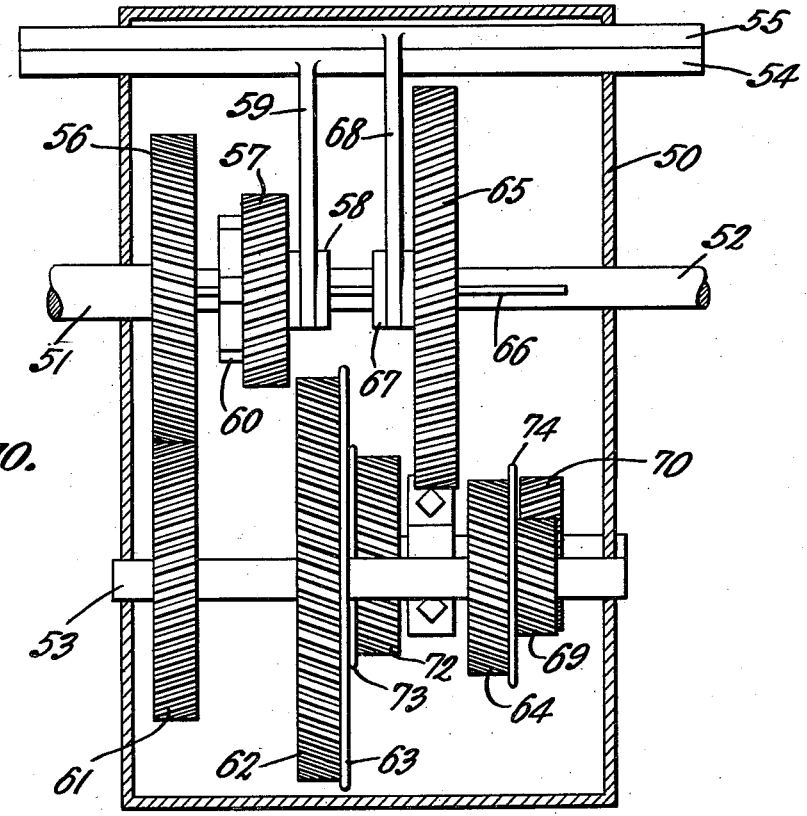
Fig. 10 is a section showing a modified form of the invention.

In the drawings there is shown, conventionally, a casing 1 in which is journaled a driving shaft 2 adapted to be coupled up with an engine shaft 3 by means of a clutch 4 of any desired construction. A driven shaft 5 is journaled in the casing 1 and is located in axial alinement with the driving shaft 2, the shaft 5 being adapted to be connected, by means of any of the known instrumentalities for that purpose, with the wheels of the vehicle. As shown in Fig. 6, one end of the driven shaft 5 may be journaled in one end of the driving shaft 2.

A jack shaft 7 is mounted to rotate in the casing 1 and is disposed parallel to the shafts 5 and 2. A rod 14 is mounted to slide in the casing 1, and a rod 8 is also mounted to slide in the casing, these rods being disposed parallel to the shafts 5 and 7. The rods 8 and 14 are typical of any suitable mechanisms for shifting certain gears to be alluded to hereinafter.

A gear wheel 9 is secured to the shaft 2. A pinion 10 is splined as shown at 11 to the shaft 5, to slide therealong, the pinion 10 having a hub 12 coacting with an arm 15 on the rod 14. The pinion 10 and the gear wheel 9 are equipped, as shown in Fig. 6, with interengageable clutch elements 16, to the end that the shaft 2 may be coupled to the shaft 5, to afford a direct drive. Fixed to the jack shaft 7 is a pinion 17 which meshes into the gear wheel 9. A gear wheel 18 is fixed to the shaft 7 and is adapted to mesh into the pinion 10 when the latter is shifted by means of the rod 14 and the arm 15, or an equivalent mechanism. A pinion 19 is secured to the jack shaft 7 and is adapted to coöperate with a shiftable gear wheel 20 connected with the shaft 5 by means of the spline 11, the gear wheel 20 having a hub 21 coacting with an arm 22 constituting a part of the rod 8. A small gear wheel 23 is fixed to the jack shaft 7 and meshes into a pinion 24 journaled on a stud shaft 25 carried by the casing 1. By means of the rod 8 or its equivalent, the gear wheel 20 may be shifted to engage either with the pinion 19 or with the pinion 24.

In a useful but not mandatory embodiment of the invention, the gear wheel 9 is provided with twenty-five teeth, the pinion 17 being provided with twenty-one teeth, the pinion 10 having nineteen teeth, and the gear wheel 18 having twenty-seven teeth. These relative ratios may be departed from, obviously. As shown at 27, the teeth of the gear wheel 9, the pinion 17, the pinion 10 and the gear wheel 18 are cut helically, or at an angle to the axes of the shafts 5 and 7. The gear wheel 18 is provided with a flange 26 coacting with the pinion 10 under circumstances to be pointed out hereinafter.

When the parts are arranged as shown in Fig. 1, the shaft 2 is rotating, without actuating the shaft 5. In Fig. 2, the shaft 5 is being rotated from the shaft 2 at a speed slower than that at which the shaft 2 rotates. In Fig. 3, power is being transmitted from the shaft 2 directly to the shaft 5, these elements rotating at a common speed. In Fig. 4, the shaft 5 is being rotated from the shaft 2 at a speed higher than that at which the shaft 2 is rotated. In Fig. 5, a reverse rotation is being imparted to the shaft 5 from the shaft 2. The construction shown in the figures above mentioned is simple, and it is considered unnecessary to trace out the various driving trains.

When the parts are disposed as shown in Fig. 3, that is, when the shaft 5 is driven directly from the shaft 2, the parts are in the positions which they will assume under all average running conditions, the power plant of the vehicle being sufficient to permit this direct drive, under practically all road conditions. Owing to the frequency of the explosions in a six, eight or twelve cylinder car, it is safe to start the car on low gear and to shift to the direct drive, without passing through a secondary speed. In the place of this secondary or intermediate speed, I have substituted a high gear, and as a consequence, the car can be run from fifty per cent. to one hundred per cent. faster than the direct drive, without increasing the speed of the engine. The consumption of gasolene and lubricating oil is correspondingly held down.

Because, as shown at 27, the teeth of the members 9, 17, 10 and 18 are cut helically, noise, end thrust, and back lash are avoided. Further, noting the specific arrangement of the helical teeth, as shown in Fig. 7, it will be seen that any end thrust caused by the teeth of the members 9 and 17 on the one hand, will be taken care of owing to the specific arrangement existing between the teeth of the members 10 and 18. The flange 26 serves to prevent the pinion 10 from riding through the gear wheel 18.

The device forming the subject matter of this application is so constructed that a direct shift from the low gear into a direct drive may be made without passing through a second or intermediate speed, a speed higher than that due to direct drive being thus available. This construction can be embodied in a comparatively inexpensive device, adapted to be applied to a low priced car, and when the extra-high gearing is used, the speed of the vehicle can be increased without speeding up the engine accordingly, it being possible to shift from low to extra-high, as distinguished from shifting from low to direct, a marked saving in gasolene and oil being the result.

Figure 11:
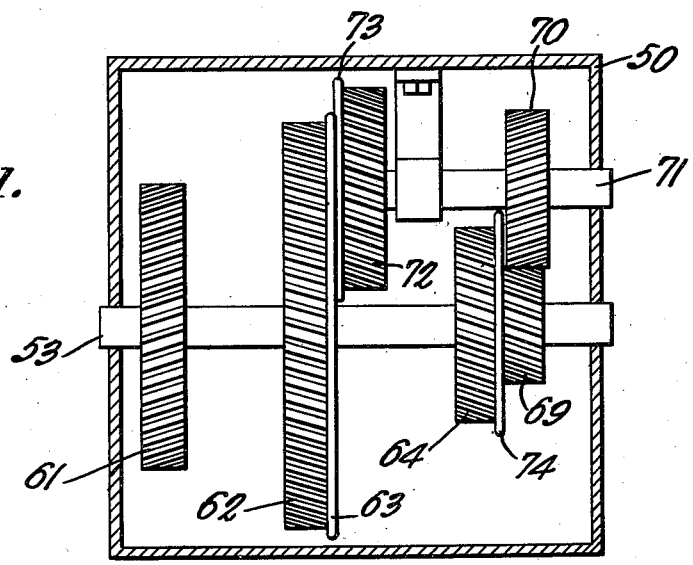
Fig. 11 is a section in which the cutting plane is passed at right angles to the cutting plane in Fig. 10.

In Figs. 10 and 11, wherein a modified form of the invention is shown, the casing appears at 50 and the driving shaft is shown at 51. The numeral 52 designates a driven shaft, and the jack shaft appears at 53. One of the shifting rods is shown at 54 and the other rod is shown at 55. The gear wheel on the shaft 51 is shown at 56, and the slidable pinion is shown at 57, the hub 58 thereof coöperating with an arm 59 constituting a part of the rod 54. The clutch is shown at 60. There is a pinion 61 on the jack shaft 53, which meshes with the gear wheel 56. The gear wheel on the shaft 53 is shown at 62 and has a flange 63. A pinion 64 is fixed to the jack shaft 53 and is adapted to coöperate with the gear wheel 65 shiftable on the shaft 52 and connected thereto by means of a spline 66, the hub 67 of the gear wheel 65 being operated by an arm 68 on the rod 55. Fixed to the jack shaft 53 is a gear wheel 69 meshing into a pinion 70 secured to a stub shaft 71 journaled for rotation on the casing 50 and provided with a pinion 72 having a flange 73, the pinion 72 being adapted to coöperate with the gear wheel 65 when the mechanism is in reverse.

In this form of the invention, the teeth on all of the gear wheels and pinions are helically cut, to avoid end thrust, and such elements as the flange 63 on the pinion 62, the flange 74 on the pinion 64 and the flange 73 on the pinion 72 prevent the various wheels from riding through each other. In this form of the invention, an added pinion, represented by the element 72 is necessary, over and above what is employed in Figs. 1 to 5 of the drawings. Owing to the arrangement of helical gears employed, the pinion 61 is balanced by the gear wheel 62, the pinion 64 and the gear wheel 69, used one at a time, the function of the flanges 63, 74 and 73 being recalled.

Having thus described the invention, what is claimed is:—

1. In a three-speed transmission mechanism for motor vehicles, a driving shaft; a driven shaft; means for coupling the shafts together directly; a counter shaft; a gear wheel on the driving shaft; a pinion on the counter shaft and meshing continuously with the gear wheel; a gear wheel on the shaft; and a pinion carried by the driven shaft to rotate therewith, the said pinion being movable into and out of mesh with the gear wheel on the counter shaft, the teeth of the gear wheel on the driving shaft and the teeth of the pinion on the driven shaft being helically disposed and oppositely inclined, the teeth of the pinion and the gear wheel on the counter shaft being helically disposed and oppositely inclined, the gear gear wheel on the counter shaft having a flange coacting with the pinion on the driven shaft to limit the lateral movement thereof.

2. In a three-speed transmission gearing for motor vehicles, a driving shaft; a driven shaft; releasable means for coupling the shafts together directly; a counter shaft; constantly intermeshing gears on the driving and counter shafts; a first connection between the shafts including a gear wheel on the counter shaft and an intermeshing shiftable pinion on the driven shaft; a second connection between the shafts and including a pinion on the counter shaft and an intermeshing shiftable gear on the driven shaft; a fourth shaft; constantly intermeshing pinions on the counter shaft and the fourth shaft; a pinion on the fourth shaft wherewith the shiftable gear of the second connection is adapted to mesh, the teeth of all of the intermeshing elements being helically disposed, the teeth of the gear of the first connection, of the pinion of the second connection, of the constantly intermeshing pinion on the countershaft, and of the pinion on the fourth shaft, being inclined oppositely to the teeth of the intermeshing gear on the counter shaft; and means for limiting the lateral movement of the shiftable gear and the shiftable pinion.

3. In a transmission mechanism, a driving shaft; a driven shaft; releasable means for coupling the shafts together directly; a counter shaft; continuously meshing gears forming a connection between the driving and counter shafts; other interengageable gears forming a connection between the counter and driven shafts, one of said other gears being shiftable into and out of mesh with its fellow, the teeth of the several gears being helically disposed, the teeth of the continuously meshing gears being oppositely inclined, and the teeth of said other gears being oppositely inclined; and means for limiting the lateral movement of the shiftable gear.

In testimony that I claim the foregoing as my own, I have hereto affixed my signature in the presence of two witnesses.

JONATHAN JOHN ROBINSON.

Witnesses:
ANNIE E. CONNELL,
FRANK A. ITGEN.